Jan. 12, 1943.  C. STEIN  2,308,123
REVERSIBLE COVER FOR COMBINATION SINKS AND TUBS
Filed June 11, 1941  2 Sheets-Sheet 1

Inventor
Charles Stein
By Clarence A. O'Brien
Attorney

Jan. 12, 1943.  C. STEIN  2,308,123
REVERSIBLE COVER FOR COMBINATION SINKS AND TUBS
Filed June 11, 1941  2 Sheets-Sheet 2
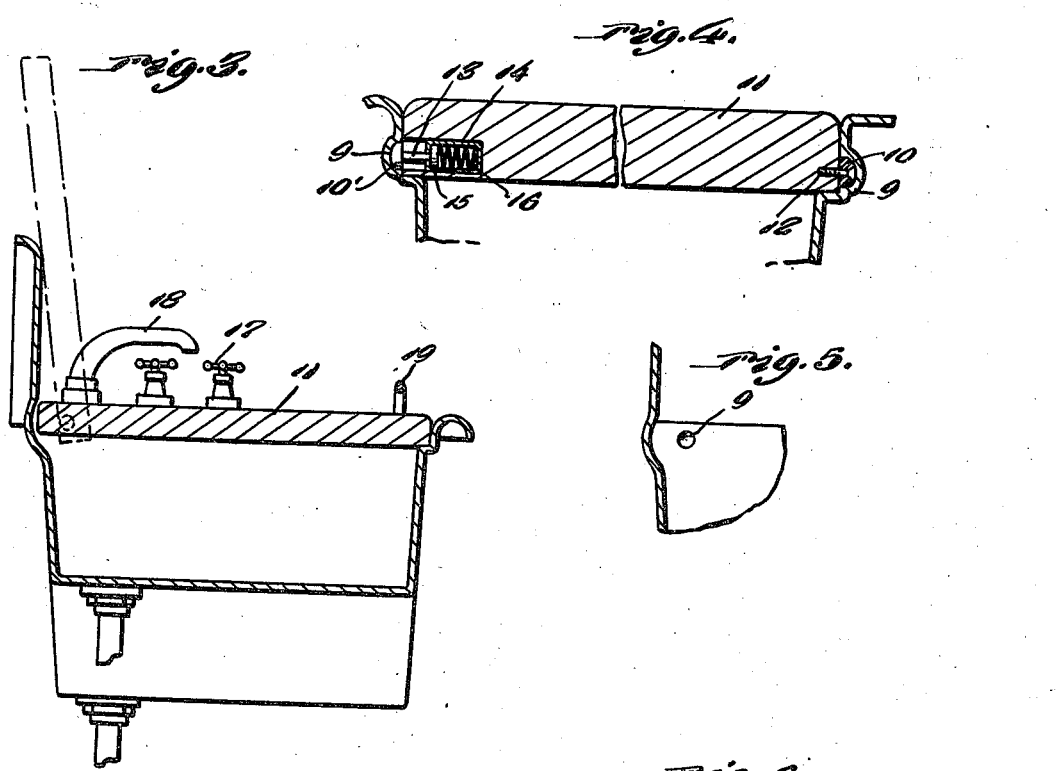

Patented Jan. 12, 1943

2,308,123

UNITED STATES PATENT OFFICE 2,308,123

REVERSIBLE COVER FOR COMBINATION SINKS AND TUBS

Charles Stein, Elizabeth, N. J.

Application June 11, 1941, Serial No. 397,636

1 Claim. (Cl. 4—187)

The present invention relates to new and useful improvements in combination sink and wash tubs and has particular reference to a cover attachment for the sink and tub adapted to close the same when not in use.

An important object of the invention is to provide pivot members at one edge of the cover seated in recesses at the opposed walls of the sink and tub to facilitate upward swinging movement of the lid.

An additional object is to provide a device of the character described of simple and practical construction, which is neat and attractive in appearance and otherwise well adapted for the purposes for which the same is intended.

Other objects and advantages reside in the details of construction and operation as more fully hereinafter described and claimed, reference being had to the accompanying drawings forming part hereof wherein like numerals refer to like parts throughout, and in which:

Figure 3 is a vertical transverse sectional view showing the valve handles positioned between the sink and tub.

Figure 4 is a fragmentary sectional view through one of the lids.

Figure 5 is a fragmentary detail of one of the recesses for pivotally mounting the lid, and Figure 6 is a fragmentary perspective view of one corner of the lid showing the pivot member thereon.

Figure 1:
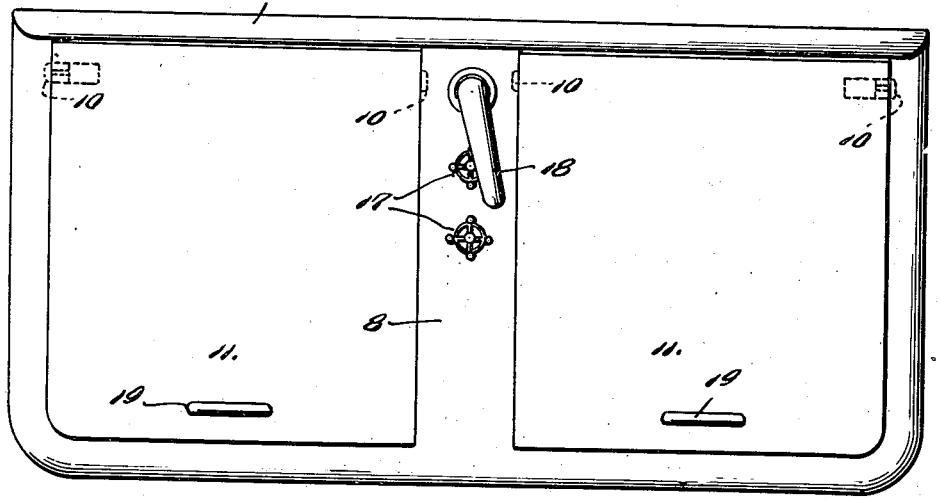
Figure 1 is a top plan view of a combined sink and tub structure provided with individual covers.
Figure 2:
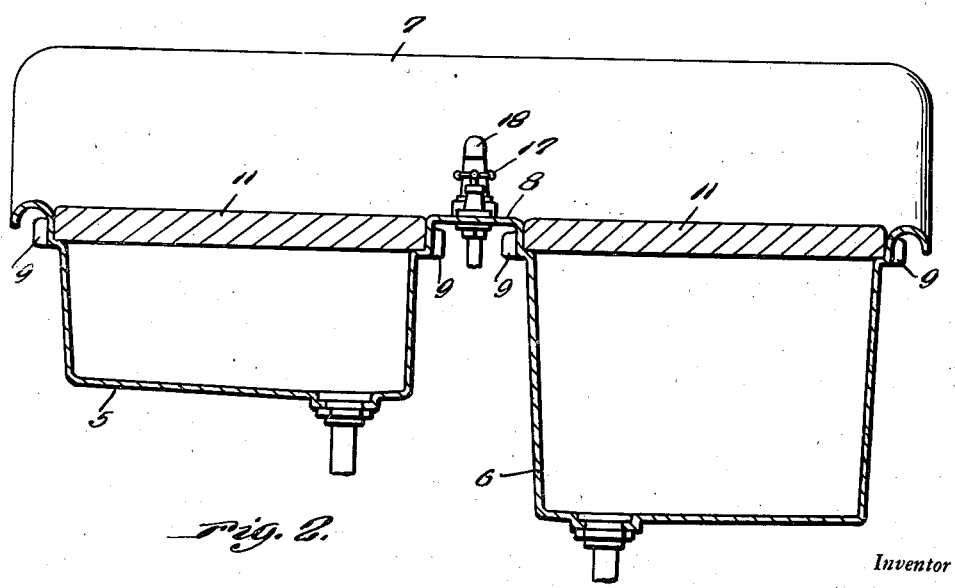
Figure 2 is a vertical longitudinal sectional view.

Referring to the drawings now in detail, wherein for the purpose of illustration I have disclosed a preferred embodiment of the invention, the numeral 5 designates a conventional sink while the numeral 6 designates a tub, the sink and tub being constructed as a unit and provided with the rear splash shield 7.

The adjacent edges of the sink and tub are spaced apart and connected by a horizontal web member 8 which extends from front to rear of the sink and tub member.

Formed in the inner walls of the sink and tub, at each side thereof and adjacent the back thereof are recesses 9 adapted for receiving substantially rounded heads 10 and 10' of rubber projecting outwardly from opposite edges of a lid 11 which is fitted between the side walls of the tub and sink. One head 10 is secured to the lid by a pin 12 fixedly anchored in the lid and the other head 10' is secured on the outer end of a plunger 13 slidably mounted in a cylindrical casing 14 recessed in the edge of the lid. The inner end of the plunger is formed with a disk 15 engaged by a coil spring 16 positioned behind the disk for projecting the head 10' outwardly.

The heads 10 and 10' provide pivotal mountings for the lid to permit upward and swinging movement thereof into a raised position when the sink or tub is in use.

In order that the lids will not interfere with access to the faucets 17 when the lids are raised the faucets are placed in the web 8 together with the swivel spout 18.

The lids fit in the sink and tub substantially flush with the upper edges thereof and a handle 19 is attached to the lid for raising the same.

Having thus described the invention, what I claim as new is:

In a combined sink and tub construction, a sink member and a tub member, a horizontal web connecting the adjacent edges of the sink and tub, recesses in the rear portion of a pair of opposed walls of the sink and tub, covers for the tub and the sink, pivot members projecting from the opposite side edges of said covers and adapted for positioning in said recesses for supporting the covers for vertical swinging movement of the front edge of the covers, a swingable faucet adapted for movement into position over either the sink or the tub, and valve handles for the faucets arranged in longitudinally spaced relation on said web.

CHARLES STEIN.